US010077109B2

(12) United States Patent
Ling

(10) Patent No.: US 10,077,109 B2
(45) Date of Patent: Sep. 18, 2018

(54) FIRST-PERSON VIEWER FOR UNMANNED VEHICLES

(71) Applicant: MaxLinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 102 days.

(21) Appl. No.: 14/605,430

(22) Filed: Jan. 26, 2015

(65) Prior Publication Data

US 2015/0210387 A1 Jul. 30, 2015

Related U.S. Application Data

(60) Provisional application No. 61/931,304, filed on Jan. 24, 2014, provisional application No. 61/931,239, filed on Jan. 24, 2014.

(51) Int. Cl.

*B64C 39/02* (2006.01)
*G05D 1/00* (2006.01)

(52) U.S. Cl.

CPC ......... *B64C 39/024* (2013.01); *G05D 1/0022* (2013.01); *G05D 1/0038* (2013.01); *G05D 1/0044* (2013.01); *B64C 2201/146* (2013.01)

(58) Field of Classification Search

None

See application file for complete search history.

(56) References Cited

U.S. PATENT DOCUMENTS 5,838,296 A * 11/1998 Butler .................... G06T 3/4023 345/24
7,131,136 B2 * 10/2006 Monroe ........... G08B 13/19641 340/945
8,633,913 B1 * 1/2014 Raghu .................. G08G 5/0021 340/945
2002/0034950 A1 * 3/2002 Sawada ................. H04W 16/32 455/446
2006/0133457 A1 * 6/2006 Wang .................. H04L 25/0202 375/148
2008/0144884 A1 * 6/2008 Habibi ................... G01C 11/02 382/103
2008/0215204 A1 * 9/2008 Roy ..................... G05D 1/0044 701/28

(Continued)

*Primary Examiner* — Nicholas K Wiltey

(74) *Attorney, Agent, or Firm* — McAndrews, Held & Malloy

(57) ABSTRACT

A remote control unit of an unmanned vehicle comprises a first communications subsystem, a processor, and a graphics processor. The first communications subsystem may be operable to receive sensor data via a first communication link between the remote control unit and the unmanned vehicle. The processor may be operable to determine a position and orientation of the unmanned vehicle based on the sensor data. The first communication subsystem may be operable to receive, via a second communication link between the remote control unit and the unmanned vehicle, a live first-person view from a camera of the unmanned vehicle. The graphics processor may be operable to generate a virtual first-person view from apriori data based on the sensor data. The processor may be operable to determine whether to present said live first-person view or said virtual first-person view based on signal quality of said second communication link.

18 Claims, 8 Drawing Sheets

602
Power up and establish data link and video link between control unit and unmanned vehicle via subsystem 104, and establish communications with network 116 via subsystem 110.

606
Receive telemetry and other low-bit-rate data via data link & send commands via data link 604
Receive live video from UV via video link 608
Determine position, orientation, speed, etc. of UV based on received data 610
Generate virtual first-person view from perspective of the UV 612
Determine quality of video link and/or the live received live video 614
Blend live video from UV and 3D rendering based on determined quality of video link

(56) References Cited

U.S. PATENT DOCUMENTS

2009/0079612 A1* 3/2009 Parfitt .................. G05B 19/054 341/157
2009/0191884 A1* 7/2009 Huber ..................... H04J 15/00 455/450
2009/0222149 A1* 9/2009 Murray .................. A63H 30/04 701/2
2009/0310608 A1* 12/2009 Chen ....................... H04L 45/48 370/389
2011/0111791 A1* 5/2011 Martz ................... H04W 88/04 455/552.1
2011/0130913 A1* 6/2011 Duggan ............... G05D 1/0061 701/23
2011/0254914 A1* 10/2011 Ng ................... H04N 21/42202 348/14.16
2012/0162253 A1* 6/2012 Collins ..................... G06T 9/00 345/629
2012/0172031 A1* 7/2012 Marocchi ................ H04W 4/06 455/422.1
2012/0265369 A1* 10/2012 Knight ................... H04B 1/034 701/2
2014/0062754 A1* 3/2014 Mohamadi ............ F41H 11/136 342/22
2014/0062758 A1* 3/2014 Mohamadi ............ F41H 11/136 342/53
2014/0063054 A1* 3/2014 Osterhout ............... G06F 3/005 345/633
2014/0222246 A1* 8/2014 Mohamadi ............ G01S 13/913 701/2
2014/0327733 A1* 11/2014 Wagreich ............... H04N 7/185 348/37
2014/0327770 A1* 11/2014 Wagreich ............. G05D 1/0038 348/148
2015/0185464 A1* 7/2015 Karube .................. G02B 21/06 348/44
2015/0235355 A1* 8/2015 Mullins .............. G02B 27/0101 345/633
2015/0346722 A1* 12/2015 Herz .................... G05D 1/0038 701/2
2016/0247115 A1* 8/2016 Pons .................... G06Q 10/087
2017/0072755 A1* 3/2017 Zhou ................... B64C 29/0033

* cited by examiner

FIRST-PERSON VIEWER FOR UNMANNED VEHICLES

PRIORITY CLAIM

This application claims priority to the following applications, each of which is hereby incorporated herein by reference in its/their entirety:

U.S. provisional patent application 61/931,304 titled "First-Person Viewer for Unmanned Vehicles" filed on Jan. 24, 2014; and U.S. provisional patent application 61/931,239 titled "Communications System for Unmanned Vehicles" filed on Jan. 24, 2014.

BACKGROUND

Conventional communications for unmanned vehicles suffer from inefficiency and poor performance. Further limitations and disadvantages of conventional approaches will become apparent to one of skill in the art, through comparison of such systems with some aspects of the present invention as set forth in the remainder of the present application with reference to the drawings.

BRIEF SUMMARY

Systems and methods are provided for communications with unmanned vehicles, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1A:
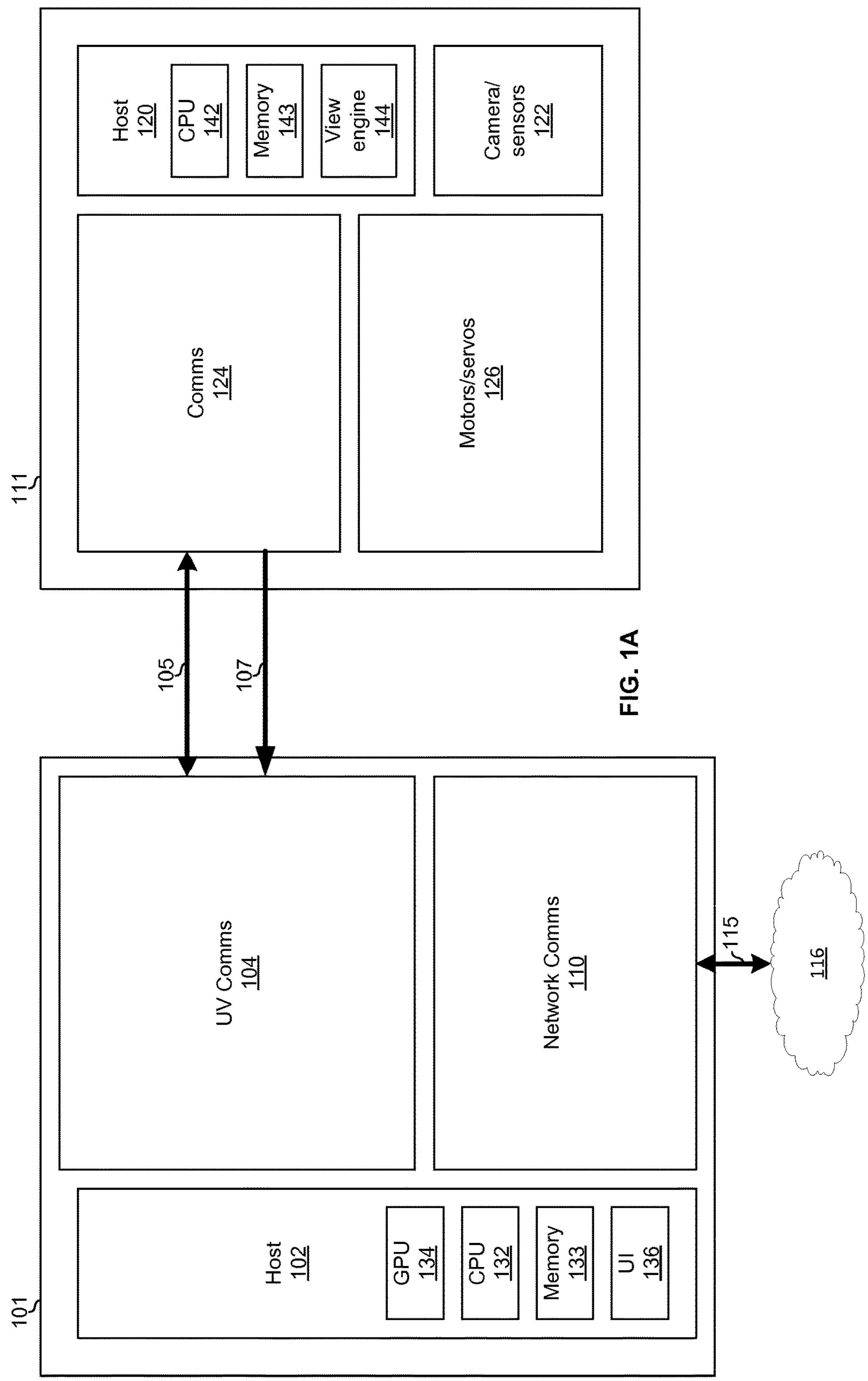
FIG. 1A is a high level block diagram of components of an example unmanned vehicle communications system in accordance with an implementation of this disclosure.

FIG. 1A is a high level block diagram of components of an example unmanned vehicle communications system in accordance with an implementation of this disclosure. Shown are an unmanned vehicle control unit 101 and an unmanned vehicle 111.

The unmanned vehicle control unit 101 comprises a host subsystem 102, an unmanned vehicle communications subsystem 104, and a network communications subsystem 110.

The host subsystem 102 may comprise, for example, a central processor (CPU) 132, graphics processor (GPU) 134, memory 133, and user interface (UI) devices 136. The UI devices may include, for example, video monitors, keyboards and/or other input devices, speakers, and/or the like.

The CPU 132 comprises circuitry operable to, interact with memory 133 and implement an operating system to control overall operation of the control unit 101.

The GPU 134 comprises circuitry operable to render, for presentation via UI 136, images received via communications subsystem(s) 104 and/or 110. Additionally, or alternatively, the GPU 134 comprises circuitry operable to render a virtual first-person view from the perspective of the unmanned vehicle 111 based on live data from unmanned vehicle 111 (received via communication subsystem 104) and/or apriori data from local memory and/or stored in the network 116. The live data may comprise images from the camera 122 and/or data from sensors 122. The apriori data may comprise, for example, previously captured images and/or topographical maps showing location/boundaries and elevation of natural and manmade structures. The images may be from ground-based, aerial, and/or satellite sources. The apriori information may be stored locally in the control unit 101 and/or in the network 116. In an example implementation, in very poor link conditions the live data may consist only of position and orientation (and possibly velocity) readings from the sensors and then a virtual first-person view may be rendered from apriori data corresponding to that position and orientation. Where velocity is included in the live data, the rendering may be predictive based on an anticipated location of the unmanned vehicle 111.

The network subsystem 110 is operable to receive and send data via a communications network (e.g., LAN such as Ethernet and/or WiFi, wireless WAN such as LTE, and/or wired WAN such as DOCSIS). For transmission, the network communications subsystem 110 may receive data from the host subsystem 102, process it as necessary for transmission into the network 116, and send the data into the network 116. For reception, the network communications subsystem 110 may receive a signal from the network 116, process it as necessary for recovering data, and conveying the data to the host subsystem 102 (e.g., receive a signal carrying a video stream from the network 110 and convey the video stream to the host subsystem 102).

For transmission, the unmanned vehicle communications subsystem 104 is operable to receive one or more data streams from host subsystem 102 (e.g., datastreams carrying commands to be sent to the unmanned vehicle), process the datastream(s) (e.g., packetize, encode, modulate, filter, and/or the like) to generate signals for transmission, and transmit the signals onto a physical medium (e.g., over the air). For reception, the unmanned vehicle communications subsystem 104 is operable to receive a signal via a physical medium (e.g., over the air), process the signal to recover a datastream carried therein (e.g., datastream comprising telemetry, audio, video, and/or other data from the unmanned vehicle 111), and convey the datastream to the host subsystem 102. For example, the unmanned vehicle communications subsystem 104 is operable to receive signals carrying a video stream captured by a camera (one of sensors 122) of unmanned vehicle 111, demodulate/decode the signals to recover the video stream, and convey the video stream to the host subsystem 102 for presentation to a user of the control unit 101.

Figure 2:
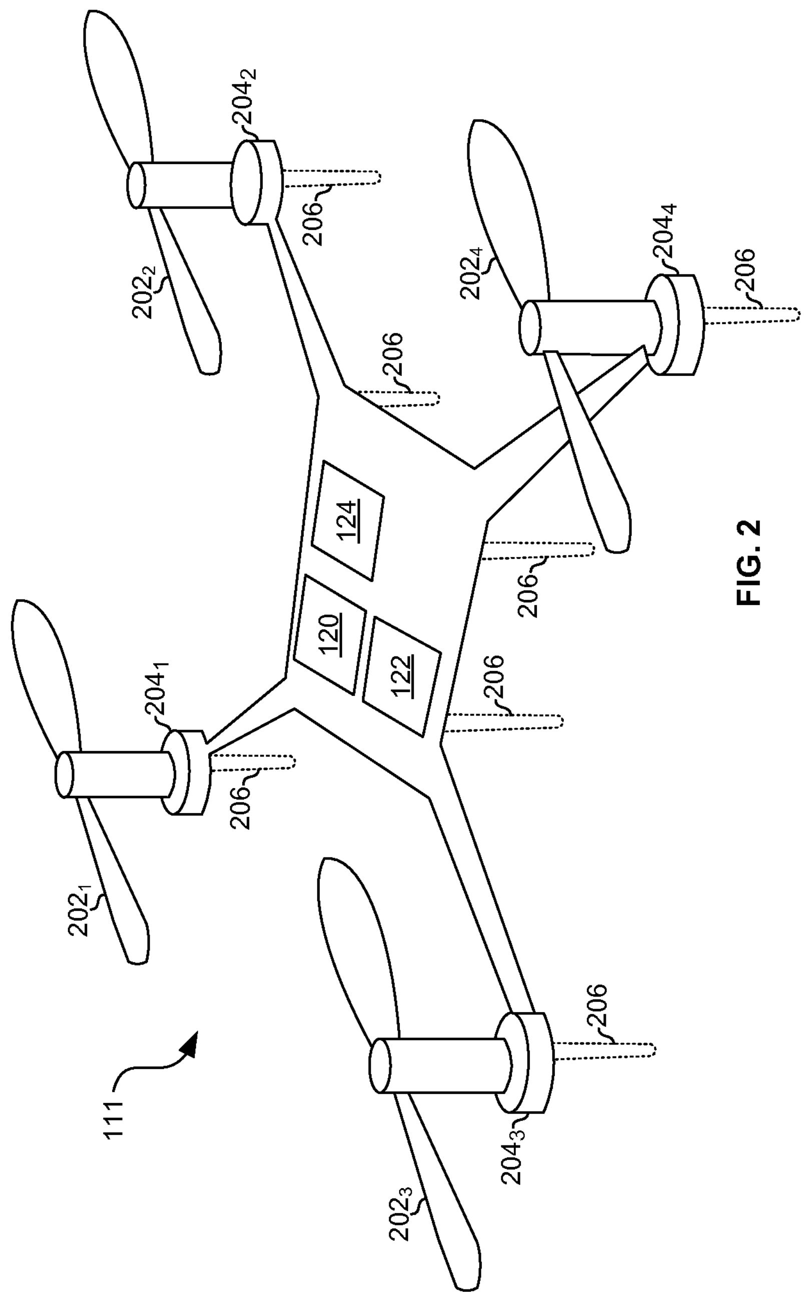
FIG. 2 depicts an unmanned vehicle comprising a communications system in accordance with an example implementation of this disclosure.

The unmanned vehicle 111 comprises a host subsystem 120, sensor subsystem 122, a communications subsystem 124, and an electromechanical subsystem 126. An example quadrotor implementation of the unmanned vehicle 111 is shown in FIG. 2.

The electromechanical subsystem 126 may comprise, for example, electrically-controlled motors, servos, and/or the like. For the quadrotor of FIG. 2, for example, the subsystem 126 comprises motors $\mathbf{204}_1$-$\mathbf{204}_4$ that drive propellers $\mathbf{202}_1$-$\mathbf{202}_4$. The speed of each of the motors $\mathbf{204}_1$-$\mathbf{204}_4$ is controlled by host subsystem 120 (e.g., based on commands received via the communications subsystem 124 and/or based on outputs of the sensor subsystem 122).

The sensor subsystem 122 may comprise, for example, a video camera, location/position sensor(s) (e.g., GPS receiver, accelerometer, compass, gyroscope, altimeter, and/or the like), distances/proximity sensors (e.g., radar), and/or the like. Readings from the sensor subsystem 122 may be conveyed to the host 120 and/or to the communications subsystem 124 for transmission to the control unit 101.

The host subsystem 120 may comprise, for example, a central processor (CPU) 142, operable to interact with memory 144 and control operations of the unmanned vehicle 111. The control operations may include, for example, controlling the sensor subsystem 122 and/or electromechanical subsystem 126 based on data received via the communications subsystem 124, controlling electromechanical subsystem 126 based on data from the sensor subsystem 122, and gathering data from the sensor subsystem 122 and conveying the data to the communication subsystem 124 for transmission to the control unit 101. The host subsystem 144 may comprise a view rendering engine 144 which may operate as, for example, described below with reference to FIG. 7.

For transmission, the unmanned vehicle communications subsystem 124 is operable to receive one or more data streams from host subsystem 120 (e.g., video, telemetry, and/or other data from sensor subsystem 122), process the datastream(s) (e.g., packetize, encode, modulate, filter, and/or the like) to generate signals for transmission, and transmit the signals onto a physical medium (e.g., over the air). For reception, the unmanned vehicle communications subsystem 104 is operable to receive a signal via a physical medium (e.g., over the air), and process the signal to recover a datastream e.g., commands for controlling the electromechanical subsystem 126 and/or sensor subsystem 122) carried therein, and convey the datastream to the host subsystem 120.

Figure 1B:
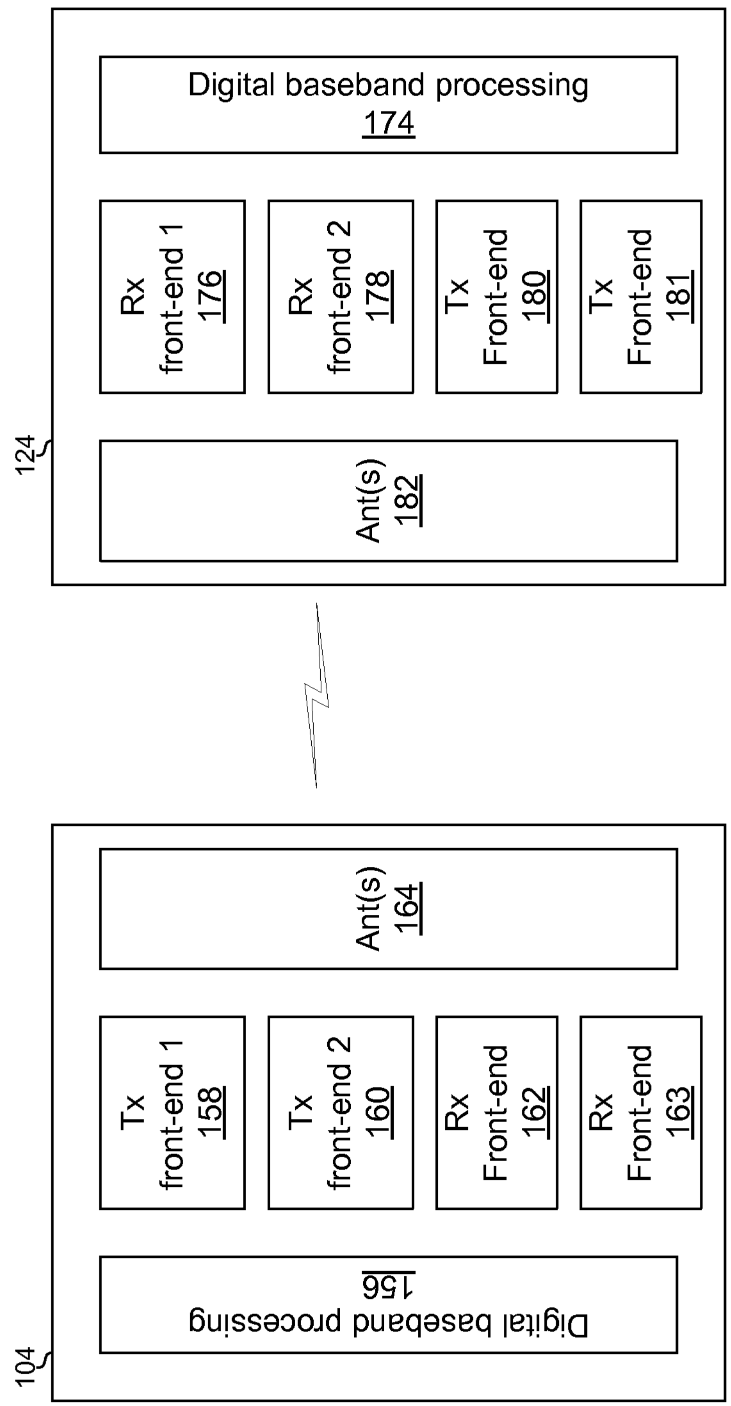
FIG. 1B is a high level block diagram of the communication subsystems of FIG. 1A.

Shown in FIG. 1B, are details of an example implementation of communications subsystem 104 and communication subsystem 124. Circuitry of the communications subsystem 104 comprises digital baseband processing circuit 156, transmitter front-end 158, transmitter front-end 160, receiver front-end 162, receiver front-end 163, and antenna subsystem 164. Circuitry of the communications subsystem 124 comprises digital baseband processing circuit 174, receiver front-end 176, receiver front-end 178, transmitter front-end 180, transmitter front-end 181, and antenna subsystem 182.

The antenna subsystem 164 comprises one or more antenna elements for use by the transmit front-end 158, the Tx front-end 160, and the Rx front-end 162. Similarly, the antenna subsystem 182 comprises one or more antenna elements for use by the Rx front-end 176, the Rx front-end 178, and the Tx front-end 180. In an example implementation, one or both of the antenna subsystems 164 and 182 comprise a plurality of antenna arrays which may be used for beamforming, diversity transmission, and/or diversity reception. As an example, referring to FIG. 2, the subsystem 182 of example quadrotor unmanned vehicle 111 comprises a plurality of antenna elements 206. Each antenna element 206 may go to a respective one of a plurality of analog-to-digital converters (ADCs) (not shown). The gains achieved by antenna diversity and/or beamforming may reduce the resolution requirements of the ADCs. For example, four 8-bit ADCs and four antennas 206 may provide as good, or better, performance as one antenna and one 10-bit ADC. The combined power consumption of the four 8-bit ADCs may be similar to, or less than, the power consumption of the single 10-bit ADC. In an example implementation, the diversity combining and/or beamforming may only be applied to one of the bands and not to the other. For example, antenna gain may be low for the lower of the two bands and thus there is not much to gain from beamforming, and high antenna gain may be achievable for the higher-frequency bands and therefore beamforming may significantly improve performance. In an example implementation, the diversity combining and/or beam forming may be applied on an as-needed basis (e.g., based on the determined channel state information).

Figure 3:
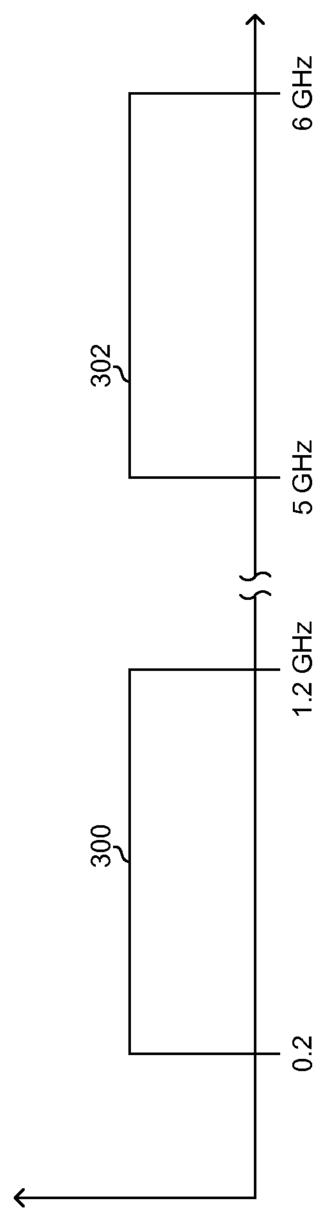
FIG. 3 illustrates two example frequency bands that may be used by an unmanned vehicle communications system in accordance with an implementation of this disclosure.

For transmit operations, the digital baseband processing circuit 156 is operable to receive control data and generate a spread-spectrum digital baseband signal carrying the control data. Which frequency bands the signal is spread onto may be dynamically controlled based on, for example, most-currently available channel state information at the time. The frequency bands onto which the signal is spread may be discontiguous, such as the frequency bands 300 and 302 shown in FIG. 3. The frequency bands may span a range that is infeasible for a single RF front-end to handle. Accordingly, there may be multiple Tx front-ends, each allocated to one or more of the bands onto which the signal is spread. FIGS. 1B and 3 depict an example in which the two bands 300 and 302 onto which the signal may be spread span 5 GHz and the Tx front-end 158 is used for the band 300 and the Tx front-end 160 is used for the band 302. The signal transmitted in this manner is the upstream traffic of link 105. The use of these spread-spectrum techniques, combined with a relatively low data rate, may enable a highly-reliable link with guaranteed data rate and latency.

The Tx front-end 158 comprises one or more transmit chains, each transmit chain comprising, for example, a digital-to-analog converter, a filter, a mixer, and a power amplifier. The Tx front-end 158 is operable to receive a portion (ranging from 0% to 100%) of the spread-spectrum digital baseband signal generated by digital baseband processing circuit 156 and process the portion of the spread-spectrum digital baseband signal for transmission on a first frequency band (e.g., band 300 of FIG. 3). Communications sent via Tx front-end 158 may also include channel state information determined by the communications subsystem 104. Where beamforming is supported, the Tx front-end 158 may comprise a plurality of RF transmit chains, each corresponding to a respective one of a plurality of antenna elements of antenna subsystem 164, and each introducing a respective phase and amplitude weighting before outputting its signal to a respective antenna element of antenna subsystem 164.

The Tx front-end 160 comprises one or more transmit chains, each transmit chain comprising, for example, a digital-to-analog converter, a filter, a mixer, and a power amplifier. The Tx front-end 160 is operable to receive a portion (ranging from 0% to 100%) of the spread-spectrum digital baseband signal generated by digital baseband processing circuit 156 and process the portion of the spread-spectrum digital baseband signal for transmission on a first frequency band (e.g., band 302 of FIG. 1B). Communications sent via Tx front-end 160 may also include channel state information determined by the communications subsystem 104. Where beamforming is supported, the Tx front-end 160 may comprise a plurality of RF transmit chains, each corresponding to a respective one of a plurality of antenna elements of antenna subsystem 164, and each introducing a respective phase and amplitude weighting before outputting its signal to a respective antenna element of antenna subsystem 164.

For receive operations, the digital baseband processing circuit 156 is operable to process a first portion of a spread-spectrum digital baseband signal from Rx front-end 162 and a second portion of the spread-spectrum digital baseband signal from Rx front-end 163. Such processing may comprise despreading followed by demodulation and decoding, to recover the transmitted datastream. The recovered datastream may comprise positioning data from sensors 122 of the unmanned vehicle 111 which may then be conveyed to host subsystem 120. The signal received in this manner is the downstream traffic of link 105. The use of these spread-spectrum techniques, combined with a relatively low data rate, may enable a highly-reliable link with guaranteed data rate and latency.

For receive operations, the digital baseband processing circuit 156 is also operable to process a second signal from one or both of RX front-ends 162 and 163. This second signal may carry a video stream captured by a camera of sensors 122 onboard the unmanned vehicle 111. The second signal may be received via communication link 107, which may be less reliable than the link 105 (e.g., may provide only best effort service). This may be the result of, for example, the link 107 not being spread as opposed to (or being spread less, or over a more narrow range of frequencies than) the link 105. Additionally, or alternatively, this may be the result of, for example, use of a much higher order modulation (or other signaling parameters needed to support the much higher data rate of the video).

The Rx front-end 162 comprises one or more analog receive chains, each comprising, for example, a low noise amplifier, mixer, filter, and analog-to-digital converters. The Rx front-end 162 is operable to receive communications from the unmanned vehicle via link 105 and, in some instances, link 107. Communications on link 105 from the unmanned vehicle 111 received via Rx front-end 162 may include channel state information which the control unit 101 may use for determining which frequency bands onto which the datastream is to be spread. The channel state information may be instantaneous and/or statistical. The channel state information may, for example, be represented as one or more channel or band reliability metrics. Additionally, communications on link 105 from the unmanned vehicle 111 received via Rx front-end 162 may include positioning data from sensors onboard the unmanned vehicle 111. Communications on link 107 from the unmanned vehicle 111 received via Rx front-end 162 may include a video stream captured by a camera of sensors 122. Where beamforming is supported, the Rx front-end 162 may comprise a plurality of RF receive chains, each corresponding to a respective one of a plurality of antenna elements of antenna subsystem 164, and each introducing a respective phase and amplitude weighting before combining of the signals from the plurality of receive chains. Each of the receive chains may be configured for reception on a frequency band used for the downlink from unmanned vehicle to controller.

For receive operations, the digital baseband processing circuit 174 is operable to process a first portion of a spread-spectrum digital baseband signal from Rx front-end 176 and a second portion of the spread-spectrum digital baseband signal from Rx front-end 178. Such processing may comprise despreading followed by demodulation and decoding, to recover the transmitted datastream. The recovered datastream may then be conveyed to host subsystem 120.

For transmit operations, the digital baseband processing circuit 174 is operable to receive positioning data and generate a spread-spectrum digital baseband signal carrying the positioning data. Which frequency bands the signal is spread onto may be dynamically controlled based on, for example, most-currently available channel state information at the time. The frequency bands onto which the signal is spread may be discontiguous, such as the frequency bands 300 and 302 shown in FIG. 3. The frequency bands may span a range that is infeasible for a single RF front-end to handle. Accordingly, there may be multiple Tx front-ends, each allocated to one or more of the bands onto which the signal is spread. FIGS. 1B and 3 depict an example in which the two bands 300 and 302 onto which the signal may be spread span 5 GHz and the Tx front-end 158 is used for the band 300 and the Tx front-end 160 is used for the band 302. The signal transmitted in this manner is the upstream traffic of link 105. The use of these spread-spectrum techniques, combined with a relatively low data rate, may enable a highly-reliable link with guaranteed data rate and latency.

Each of the Tx front-end 180 and 181 comprises one or more RF transmit chains, each RF transmit chain comprising, for example, a digital-to-analog converter, a filter, a mixer, and a power amplifier. Signals from the baseband processor 174 carrying positioning data are transmitted on the link 105 and signals from the baseband processor 174 carrying a video stream are transmitted on the link 107. Transmissions on the link 105 may use the spread-spectrum techniques described above to provide guaranteed data rate and latency. Transmissions on the link 107 may not use the spread spectrum techniques and may provide only best-effort service. For example, the link 107 may be relegated to frequency bands that channel state information indicates are not sufficiently reliable for the positioning data. Where beamforming is supported, each of the Tx front-ends 180 and 181 may comprise a plurality of RF transmit chains, each corresponding to a respective one of a plurality of antenna elements of antenna subsystem 182, and each introducing a respective phase and amplitude weighting before outputting its signal to a respective antenna element of antenna subsystem 182.

The Rx front-end 176 comprises one or more analog receive chains, each comprising, for example, a low noise amplifier, mixer, filter, and analog-to-digital converters. The Rx front-end 176 is operable to receive energy on a first frequency band (e.g., band 300 in FIG. 1B). In an example implementation, each receive chain of the Rx front-end 176 may be operable to concurrently capture, downconvert, and digitize the entire band that it operates on. The band may encompass a plurality of channels (e.g., a plurality of individual single-carrier channels and/or a plurality of OFDM sub-channels). For example, each receive chain of the Rx front-end 176 may digitize the entire band 300 from 0.2 Ghz to 1.2 GHz and output the digitized 1 GHz-bandwidth signal to digital baseband processing circuit 174. Where beamforming is supported, the Rx front-end 176 may comprise a plurality of RF receive chains, each corresponding to a respective one of a plurality of antenna elements of antenna subsystem 182, and each introducing a respective phase and amplitude weighting before combining of the signals from the plurality of receive chains.

The Rx front-end 178 comprises one or more analog receive chains, each comprising, for example, a low noise amplifier, mixer, filter, and analog-to-digital converters. The Rx front-end 178 is operable to receive energy on a second frequency band (e.g., band 302 in FIG. 1B). In an example implementation, each receive chain of the Rx front-end 176 may be operable to concurrently capture, downconvert, and digitize the entire band that it operates on. The band may encompass a plurality of channels (e.g., a plurality of individual single-carrier channels and/or a plurality of OFDM sub-channels). For example, each receive chain of the Rx front-end 176 may digitize the entire band 153 from 5 Ghz to 6 GHz and output the digitized 1 GHz-bandwidth signal to digital baseband processing circuit 174. Where beamforming is supported, the Rx front-end 178 may comprise a plurality of RF receive chains, each corresponding to a respective one of a plurality of antenna elements of antenna subsystem 182, and each introducing a respective phase and amplitude weighting before combining of the signals from the plurality of receive chains.

The two discontiguous frequency bands (e.g., 300 and 302) may have very different characteristics (e.g., propagation characteristics, amounts of usage/interference, etc.). Bands with drastically different characteristics may be selected to decrease the chances of a single interferer (or group of interferers) critically impacting both bands at the same time. For example, referring to FIG. 3, the band 300 from 0.2 to 1.2 GHz and the second band from 5 to 6 GHz are typically used for different applications and thus interference on one band is likely uncorrelated with interference on the other. Although two frequency bands (and two corresponding pairs of transmit front-ends and receive front-ends) are used here for illustration, in various implementations three or more may be used.

Figure 4:
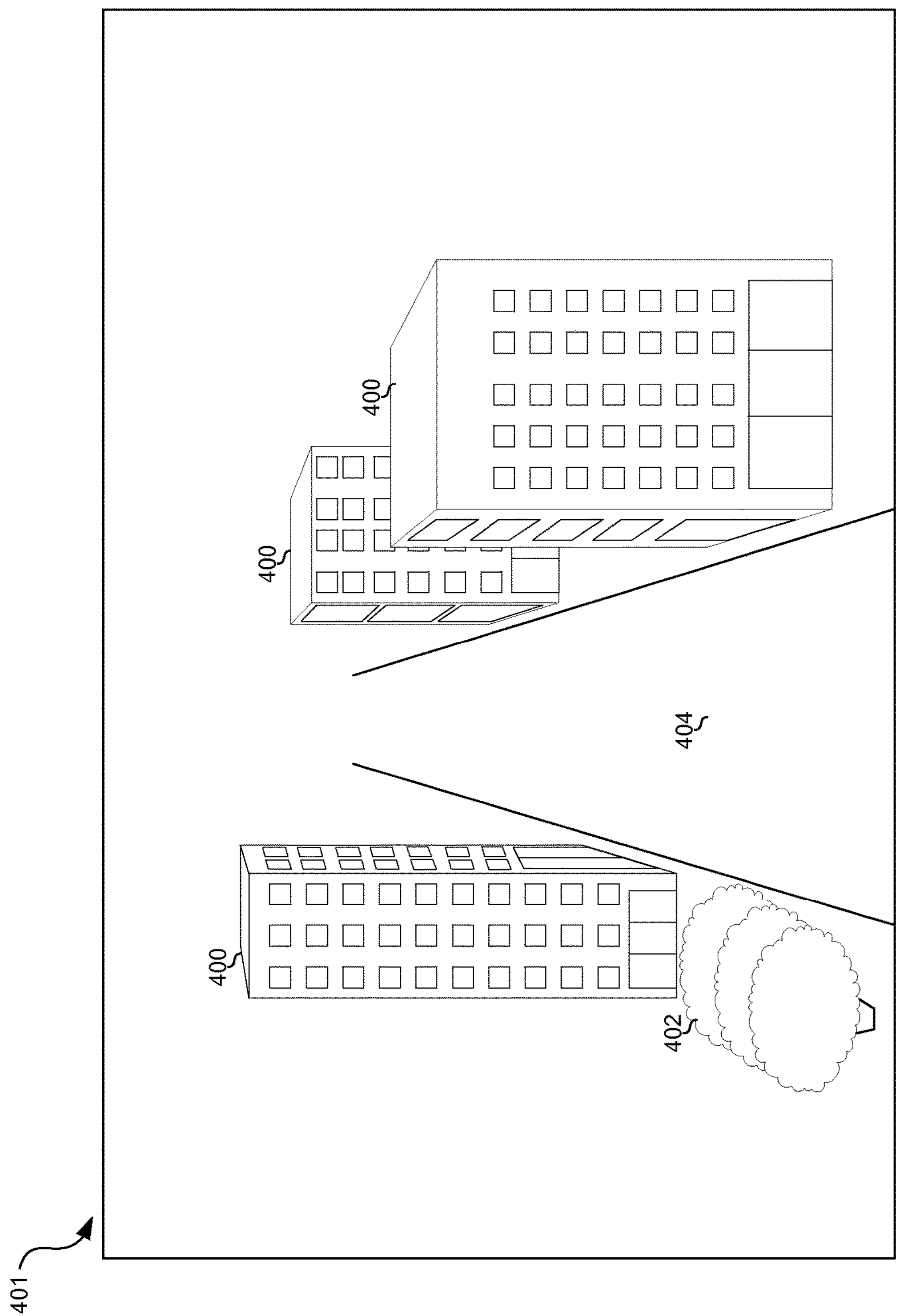
FIG. 4 shows an example live first-person view from an unmanned vehicle.

In FIG. 4, displayed on the user interface 136 of the control unit 101 is a live view from a camera onboard the unmanned vehicle 111. An image may be considered "live" where the latency from the time it was captured until the time it is displayed on the control unit 101 is below some determined threshold that reduces the risk of crashing the unmanned vehicle to an acceptable level. That is, for a fast moving unmanned vehicle 111 the latency may be much shorter (e.g., on the order of milliseconds) to be considered live but for a slow moving vehicle the latency may be longer (e.g., on the order of seconds) and still considered "live." In an example implementation, the latency of the video may be allowed to vary based on the speed of the unmanned vehicle. For example, as the unmanned vehicle slows down, the image capture rate, the image processing rate, the bandwidth of the link between communication subsystem 104 and 124, and/or other parameters may be slowed down to reduce power consumption, which may result in increased latency. Conversely, as the unmanned vehicle speeds up, such parameters may increase to reduce latency. In the example shown, the unmanned vehicle is navigating along a road 404 lined by buildings 400 and trees.

Figure 5:
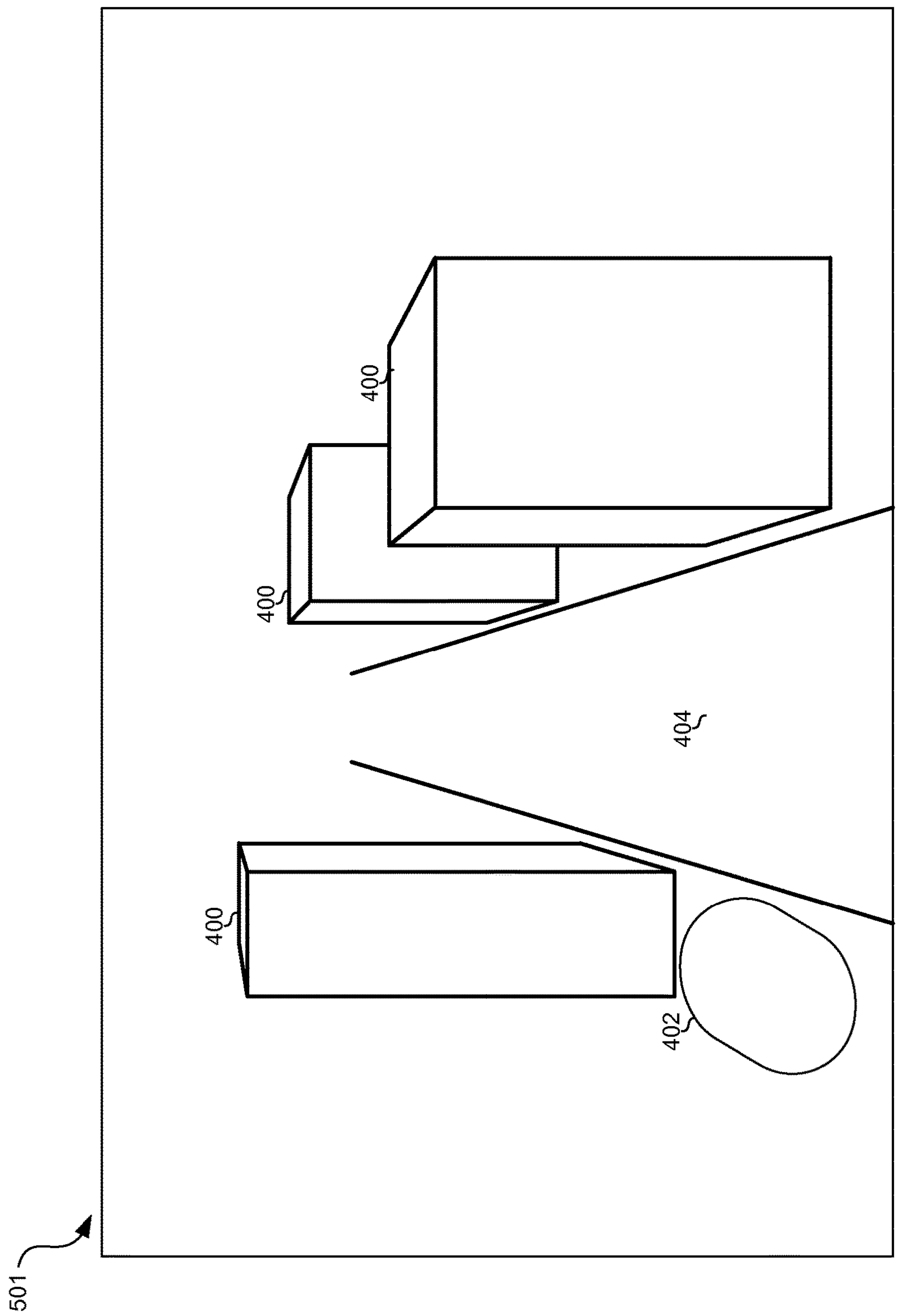
FIG. 5 shows an example virtual first-person view from an unmanned vehicle.

A virtual view from the same position and orientation is shown in FIG. 5. In the virtual view, obstacles such as the buildings 400 and trees 402 may be represented by simply their boundaries/edges, which may be of primary importance where the goal is not crashing into them. Furthermore, only representing the edges may decrease the data rate of the virtual stream such that it can be streamed over a relatively slow connection.

Figure 6:
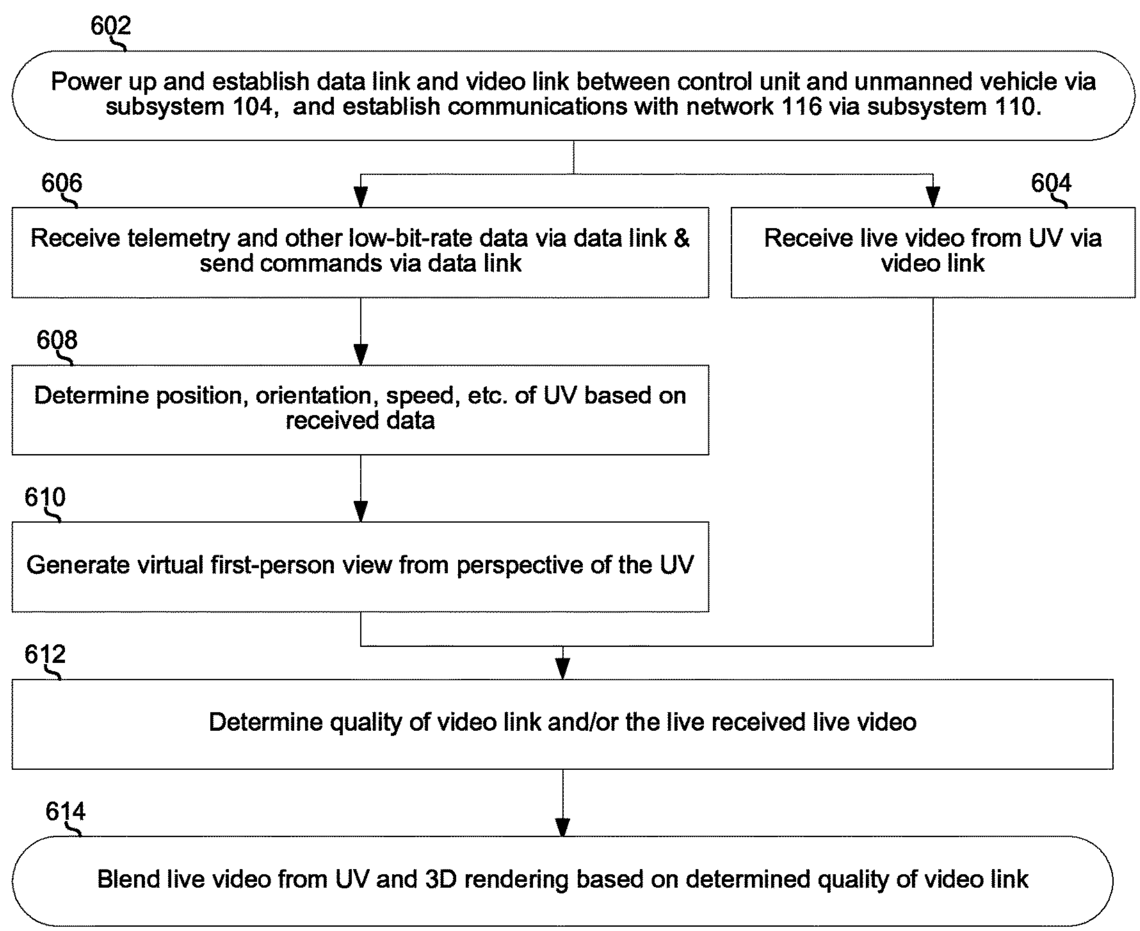
FIG. 6 is a flowchart illustrating an example process for providing a first-person view for controlling an unmanned vehicle.

FIG. 6 is a flowchart illustrating an example process for providing a first-person view for controlling an unmanned vehicle. The process begins in block 602 when the control unit 101 and the unmanned vehicle 111 are powered up and establish a data communications link and a video communications link between communication subsystems 104 and 124.

In block 604, the control unit 101 begins receiving, via the established video link, live video from a camera that is on-board the unmanned vehicle 111. In parallel with block 604, the process proceeds to blocks 606 through 610.

In block 606, the unmanned vehicle begins sending readings from its sensors (e.g., radar and/or laser telemeter(s), GPS, and/or others) to the control unit 101 via the data link and the control unit 101 sends commands to the unmanned vehicle via the data link.

In block 608, the control unit determines position, orientation, speed, altitude, etc., of the unmanned vehicle 111 based on the data received via the data link. In an example implementation, the position and orientation may be determined based on data from one or both of a global navigation satellite system receiver onboard the unmanned vehicle, and a telemeter (e.g., laser and/or radar). For example, a coarse determination may be based on GPS coordinates and then a fine determination may be based on distance to known landmarks near the GPS coordinates.

In another example implementation, position may be determined based on images captured by a camera onboard the unmanned vehicle and those images may be compared against a database of images captured near a roughly determined position (e.g., based on GPS, telemeters, and/or the like). When features of the image from the unmanned vehicle match features in a database image, metadata for the database image may be used to determine the location of the unmanned vehicle.

In block 610, the control unit 101 generates a virtual first-person view from the perspective of the unmanned vehicle 111. Apriori data corresponding to the unmanned vehicles current position and orientation may be used to render the virtual first-person view. The apriori data may be retrieved from local memory and/or the network 116. Where current velocity of the unmanned vehicle is available apriori data corresponding to a predicted position and orientation of the unmanned vehicle 111 may be used for rendering the virtual first-person view.

In block 612, the control unit 101 determines the signal quality of the video link and/or the quality of the video received via the video link. Signal quality may be characterized by one or more metrics such as signal to noise ratio (SNR) bit error rate (BER) and/or the like.

In block 614 the virtual first-person view generated in block 610 and the live first-person view generated in block 604 are combined for presentation via the user interface of the control unit 101. The combining may comprise, for example, overlaying the virtual first-person view on the live first-person view and controlling the transparency of the virtual first-person view based on the determined quality of the video link and/or quality of the video itself. If the video link and video meet some quality threshold(s), the virtual first-person view may be fully transparent such that the user sees only the live first-person view. If the video link and/or video do not meet the quality threshold(s), the virtual first-person view may be fully opaque such that the user sees only the virtual first-person view. The video signal may be poor because of, for example, poor signaling conditions (e.g., physical obstructions, long distance, nearby interferers, etc.) and/or because of poor image capture conditions (e.g., glare, too dark, or other bad lighting conditions). If the video link and/or video are of intermediate quality, the virtual first person view may be semi-opaque and/or may be opaque in some parts of the field of vision and transparent in others. This latter scenario may be used, for example, to sharpen edges of structures/obstacles, indicate which objects have moved relative to the time at which the data used to generate the virtual video stream was captured, and/or the like. In some instances, enhancement of the live first-person view with information from the virtual first-person view may be used even when the video link and/or video are of high quality.

Where the unmanned vehicle 111 is controlled by a non-human agent (e.g., an agent running on a network server), generation of an actual video may not be necessary. Rather, the agent may simply weigh the reliability of the two views when making decisions for controlling the unmanned vehicle 111.

Figure 7:
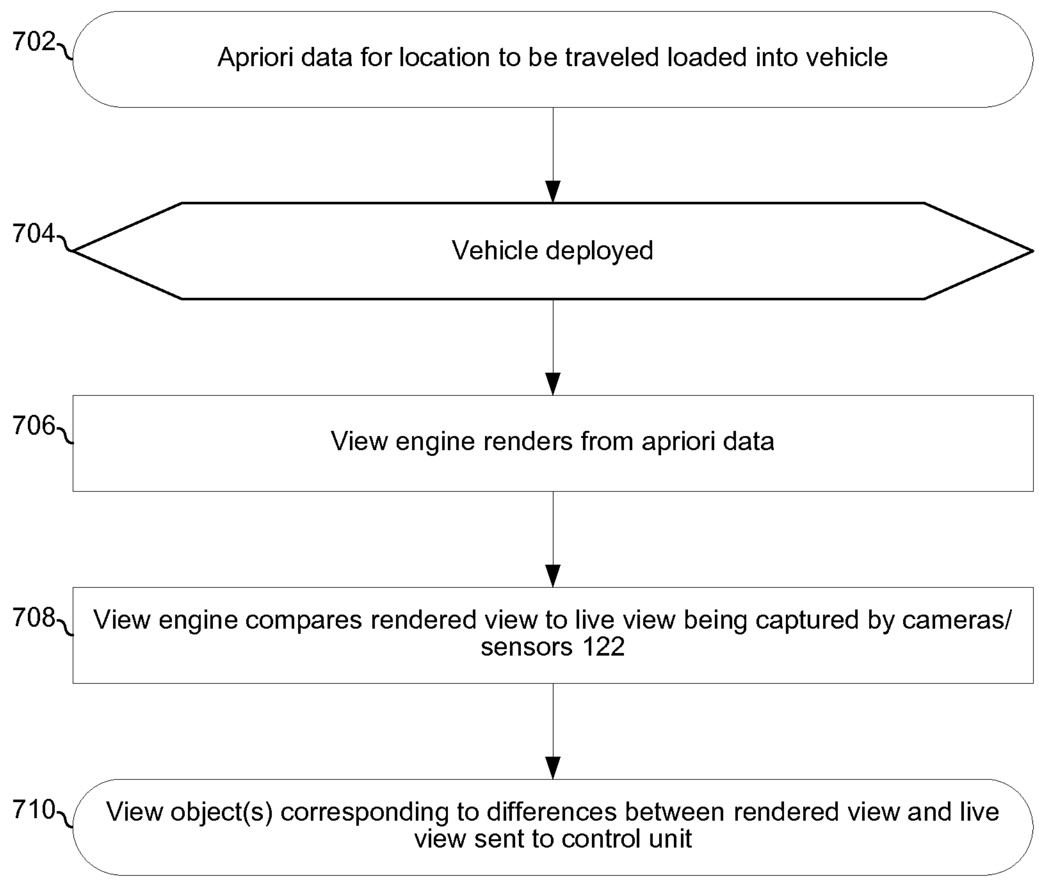
FIG. 7 is a flowchart illustrating an example process for providing a virtual first-person view from an unmanned vehicle.

FIG. 7 is a flowchart illustrating an example process for providing a virtual first-person view from an unmanned vehicle. In block 702 apriori data (e.g., topographical maps) are loaded into the unmanned vehicle 111. In block 704, the vehicle is deployed. In block 706, during the deployment, the view engine 144 receives data from sensors 122 to determine the current position and orientation of the vehicle 111 and/or predict the future position and/or orientation of the vehicle 111. The view engine 144 then retrieves apriori data corresponding to the current or future position and orientation and renders a virtual first-person view from the apriori data. In block 708, the view engine 144 compares the virtual first-person view to a live data being received via on-board camera and/or sensors. In block 710, differences between the virtual first-person view and the live data (e.g., non-permanent objects such as cars, etc.) are encoded into a data block with is then sent to the control unit 101. In this manner, only a portion of the view needs to be sent to the control unit, drastically reducing the amount of bandwidth needed on the link. The control unit 101 may then combine the data block with the apriori data to render a virtual first-person view that reflects objects not in the apriori data.

In accordance with an example implementation of this disclosure, a remote control unit (e.g., 101) of an unmanned vehicle (e.g., 111) comprises a first communications subsystem (e.g., 104), a processor (e.g., CPU 132), and a graphics processor (e.g., 134). The first communications subsystem may be operable to receive sensor data via a first communication link (e.g., 105) between the remote control unit and the unmanned vehicle. The processor may be operable to determine a position and orientation of the unmanned vehicle based on the sensor data. The first communication subsystem may be operable to receive, via a second communication link (e.g., 107) between the remote control unit and the unmanned vehicle, a live first-person view from a camera of the unmanned vehicle. The graphics processor may be operable to generate a virtual first-person view from apriori data based on the sensor data. The processor may be operable to determine whether to present said live first-person view or said virtual first-person view based on signal quality of said second communication link. The processor may be operable to determine to present the virtual first-person view when the signal quality is below a determined threshold, and determine to present the live first-person view when the signal quality is above the determined threshold. The sensor data may comprise data from one or both of: data from a global navigation system satellite receiver onboard the unmanned vehicle, and data from a telemeter onboard the unmanned vehicle. The first communications link may provide guaranteed data rate and latency, and the second communications link may provide best effort data rate and latency. The apriori data may comprise topographical data. The apriori data may comprise a photograph previously captured from the position of the unmanned vehicle. The first communication subsystem may be operable to adjust bandwidth of the second communication link based on a travel speed of the unmanned vehicle. The system may comprise circuitry (e.g., 144) of the unmanned vehicle operable to generate the virtual first-person view from the apriori data based on the sensor data. The circuitry of the unmanned vehicle may be operable to determine differences between the virtual first-person view to the live first-person view. The circuitry of the unmanned vehicle may be operable to encode the differences into a data block, and transmit the data block via the second communication link. The system may comprise a second communication subsystem operable to retrieve the apriori data from a network database.

In an example implementation, the processor may be operable to composite the live first-person view and the second first-person view, wherein a transparency of the live first-person view and a transparency of the second first-person view during the compositing are controlled based on quality of the second communication link. The processor may be operable to, during the compositing: increase the transparency of the live first-person view and decrease the transparency of the virtual first-person view as the signal quality of the second communication link decreases, and decrease the transparency of the live first-person view and increase the transparency of the virtual first-person view as the signal quality of the second communication link increases.

Although aspects of this disclosure have been described with respect to unmanned vehicles, they more generally provide methods and systems for improving telepresence of an unreliable communication channel.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a remote control unit of an unmanned vehicle, the remote control unit comprising:
a first communication subsystem operable to:
receive sensor data via a first communication link between said remote control unit and said unmanned vehicle; and
receive a live first-person view from a camera of said unmanned vehicle via a second communication link between said remote control unit and said unmanned vehicle;
a graphics processor operable to generate a virtual first-person view from apriori data based on said sensor data; and
a processor operable to:
determine a position and orientation of said unmanned vehicle based on said sensor data;
determine whether to present said live first-person view or said virtual first-person view on a user interface of said control unit based on signal quality of said second communication link, said signal quality determined by signal-to-noise ratio and/or bit error rate;
determine to present said virtual first-person view when said signal quality is below a determined threshold; and
determine to present said live first-person view when said signal quality is above said determined threshold; and
wherein said remote control unit is operable to receive differences between said virtual first-person view and said live first-person view determined and transmitted by circuitry of said unmanned vehicle.

2. The system of claim 1, wherein said sensor data comprises data from one or both of: data from a global navigation system satellite receiver onboard said unmanned vehicle, and data from a telemeter onboard said unmanned vehicle.

3. The system of claim 1, wherein:
said first communication link provides a higher likelihood of a desired data rate and latency compared to said second communication link.

4. The system of claim 1, wherein said apriori data comprises topographical data.

5. The system of claim 1, wherein said apriori data comprises a photograph previously captured from said position.

6. The system of claim 1, wherein said communication subsystem is operable to adjust bandwidth of said second communication link based on a travel speed of said unmanned vehicle.

7. The system of claim 1, wherein said processor is operable to predict said position and orientation of said unmanned vehicle based on said sensor data.

8. The system of claim 1, comprising circuitry of said unmanned vehicle operable to generate said virtual first-person view from said apriori data based on said sensor data.

9. The system of claim 1, wherein said circuitry of said unmanned vehicle is operable to encode said differences between said virtual first-person view and said live first-person view into a data block.

10. The system of claim 9, wherein said circuitry of said unmanned vehicle is operable to transmit said data block via said second communication link.

11. The system of claim 1, comprising a second communication subsystem operable to retrieve said apriori data from a network database.

12. A method comprising:
in a remote control unit of an unmanned vehicle:
receiving sensor data via a first communication link between said remote control unit and said unmanned vehicle;
receiving a live first-person view from a camera of said unmanned vehicle via a second communication link between said remote control unit and said unmanned vehicle;
determining a position and orientation of said unmanned vehicle based on said sensor data;
generating a virtual first-person view from apriori data based on said sensor data;
determining whether to present said live first-person view or said virtual first-person view on a user interface of said control unit based on signal quality of said second communication link, said signal quality determined by signal-to-noise ratio and/or bit error rate;
receiving differences between said virtual first-person view and said live first-person view determined and transmitted by circuitry of said unmanned vehicle;
determining to present said virtual first-person view when said signal quality is below a determined threshold; and
determining to present said live first-person view when said signal quality is above said determined threshold.

13. The method of claim 12, wherein said sensor data comprises data from one or both of: data from a global navigation system satellite receiver onboard said unmanned vehicle, and data from a telemeter onboard said unmanned vehicle.

14. The method of claim 12, wherein:
said first communication link provides a higher likelihood of a desired data rate and latency than said second communication link.

15. The method of claim 12, wherein said apriori data comprises topographical data.

16. The method of claim 12, wherein said apriori data comprises photographs previously-captured from said position.

17. The method of claim 12, comprising adjusting bandwidth of said second communication link based on a travel speed of said unmanned vehicle.

18. The method of claim 12, comprising predicting a position and orientation of said unmanned vehicle based on said sensor data.

* * * * *